United States Patent [19]

Kilpeläinen et al.

[11] Patent Number: 5,374,148
[45] Date of Patent: Dec. 20, 1994

[54] PROCEDURE AND APPARATUS FOR FEEDING A MATERIAL INTO A PRESSURIZED SPACE

[75] Inventors: Reijo Kilpeläinen, Kitee; Risto Laukkanen; Matti Virolainen, both of Savonlinna, all of Finland

[73] Assignee: Kone Oy, Helsinki, Finland

[21] Appl. No.: 40,025

[22] Filed: Mar. 30, 1993

[30] Foreign Application Priority Data

Mar. 30, 1992 [FI] Finland ............... FI921403

[51] Int. Cl.⁵ .................................... F23K 3/00
[52] U.S. Cl. .................... 414/217; 198/747; 414/292; 414/786
[58] Field of Search ............... 414/158, 176, 198, 199, 414/217, 287, 292, 786; 110/109, 114; 198/747

[56] References Cited

U.S. PATENT DOCUMENTS

| 2,487,464 | 11/1949 | Mosshart | 414/176 X |
| 3,621,774 | 11/1971 | Dedio et al. | 414/198 X |
| 3,633,770 | 1/1972 | Howard | 414/217 X |
| 3,995,734 | 12/1976 | Berg, Jr. | 198/747 X |
| 4,043,471 | 8/1977 | Trumbull et al. | 414/292 X |
| 4,047,901 | 9/1977 | Baron et al. | 48/86 R |
| 4,255,161 | 3/1981 | Grimminger et al. | 48/86 R |
| 5,192,188 | 3/1993 | Kunz et al. | 414/217 |

FOREIGN PATENT DOCUMENTS

| 267283 | 1/1927 | Canada |  |
| 541820 | 1/1932 | Germany | 414/292 |
| 2950011 | 12/1979 | Germany |  |
| 151044 | 11/1979 | Norway |  |
| 9206030 | 4/1992 | WIPO | 414/292 |

Primary Examiner—David A. Bucci

[57] ABSTRACT

The invention relates to a procedure and an apparatus for feeding solid material into a pressurized space. According to the invention, the apparatus comprises a feed chamber (12) communicating with the pressurized space (1) via a gate (13), a piston cylinder (8) adjoining the feed chamber (12) and provided with an aperture (28) in its wall for the intake of solid material, and a piston (9) which consists of an inner and an outer piston (11,10), moves within the piston cylinder (8) and closes the feed chamber (12) tightly when in its front position. The inner piston (11) moves inside the outer piston (10) and in the feed chamber (12) to insert the solid material into the pressurized space (1). In the procedure of the invention, the solid material is supplied into the feed chamber (12) through the piston cylinder (8) and the aperture (28) in its wall while the piston (9) is in its rear position, the piston (9) is thrust into its front position so that the feed chamber (12) is tightly closed, a pressure corresponding to that in the pressurized space (1) is formed in the feed chamber (12), the gate (13) between the pressurized space (1) and the feed chamber (12) is opened and the inner piston (11) is thrust into its front position.

11 Claims, 4 Drawing Sheets

PROCEDURE AND APPARATUS FOR FEEDING A MATERIAL INTO A PRESSURIZED SPACE

BACKGROUND OF THE INVENTION

The present invention relates to a procedure for feeding a solid material into a pressurized space and to an apparatus for feeding a solid material into a pressurized space.

In process industry systems there are cases where a solid material has to be fed into a pressurized space. For example, for the gassing of solid fuel in gas power plants, the fuel is fed into a feed chamber where the pressure is 30 bar. The feed chamber is filled with nitrogen to prevent dust explosion. The amount of nitrogen escaping in connection with the supply of fuel should be minimized because creating a pressure and producing nitrogen involve high expenses.

A certain older solution for feeding a solid fuel into a pressurized space uses an intermediate silo system in which a space near the pressurized space is filled with solid fuel and the pressure in the intermediate silo is brought to the level prevailing in the pressurized space. After the correct pressure has been reached, a port between the intermediate silo and the pressurized space is opened and the solid material is inserted into the pressurized space. A system like this requires a large intermediate silo volume which has to be pressurized and the air in the silo has to be replaced with nitrogen or an equivalent gas.

SUMMARY OF THE INVENTION

The object of the present invention is to produce a solution for feeding a solid material into a pressurized space with minimized spillage.

According to the invention, the solid material is supplied through a feed chamber having a small volume, which is why the amount of energy required for the generation of the pressure sure is small. The solid material is subjected to pressure and moved as a unit into the pressurized space.

In an embodiment of the invention, the sealing between outer piston and cylinder is specially shaped so that it will be pressed against the head cup surface of the piston. Efficient sealing is used to keep the spillage at a minimum.

The invention can also be used for the transfer of material from a pressurized space into another space having a different pressure. Furthermore, it is possible to replace the gas surrounding the solid material with another and to feed the material into a space filled with the other gas.

BRIEF DESCRIPTION OF THE DRAWINGS

In the following, the invention is described by the aid of one of its embodiments by referring to the drawings, in which.

DESCRIPTION OF THE PREFERRED EMBODIMENT(S)

Figure 1:
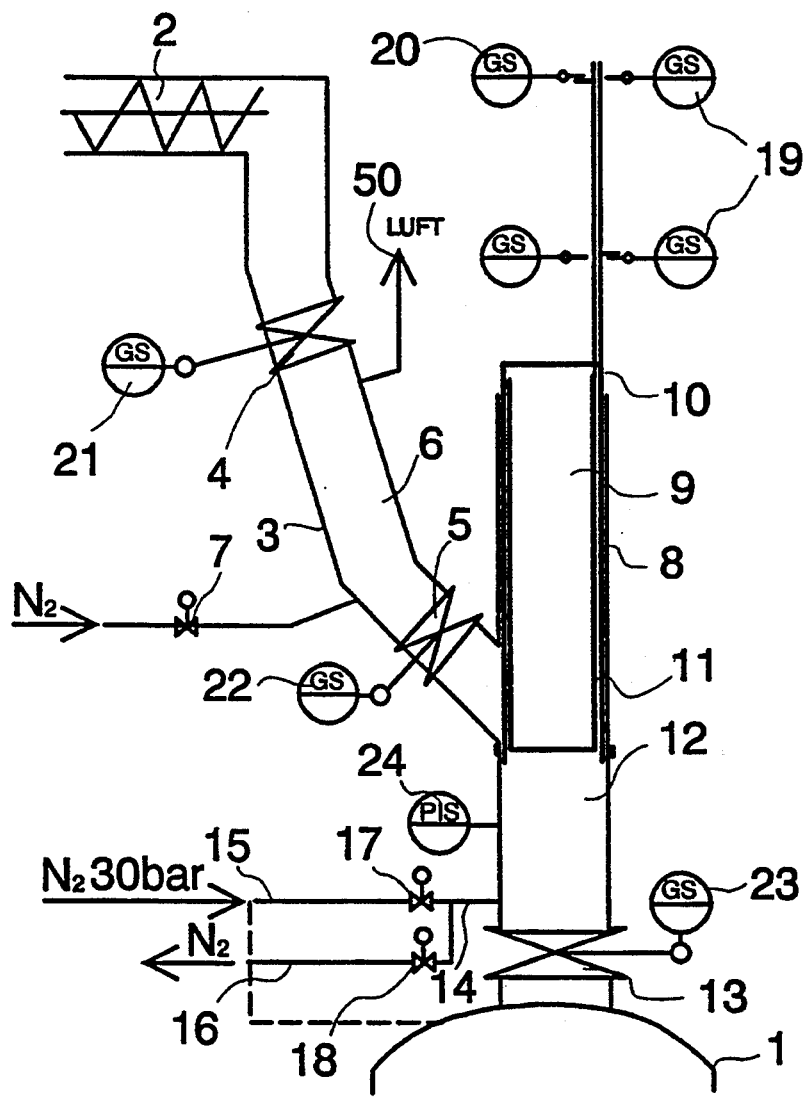
FIG. 1 presents a diagram drawing of the apparatus of the invention.

For the gassing of fuel in a gas power plant, solid fuel, such as wood chips, is fed into a pressurized feed bunker 1 using an apparatus as presented in FIG. 1. The chips are brought to the upper end of a feed tube 3 e.g. by means of a screw conveyor 2. If necessary, the feed tube is provided with valves 4 and 5. The space 6 between the valves in the feed tube is filled with nitrogen to replace the air entering along with the chips. The nitrogen is supplied via an inlet pipe 7 and the replaced air is removed via an outlet pipe 50. The lower end of the feed tube 3 is joined with the wall of the cylinder 8.

Mounted in the cylinder 8 is a movable piston 9 consisting of an outer piston 10 and an inner piston 11, which is movable with respect to the outer piston. The inner piston 11 can be pushed into a feed chamber 12 forming an extension of the cylinder to force the solid material in it through a valve device 13 into the feed bunker 1. Connected to the feed chamber is a nitrogen conduit 14 to allow the feed chamber to be pressurized and supplied with nitrogen. The conduit is preferably connected to a point close to the junction between the cylinder 8 and the feed chamber 12, so that the gas flow simultaneously cleans the sealing surface at the junction. The nitrogen conduit has a feed branch 15 and an exhaust branch 16, which are provided with corresponding valves 17 and 18. Conduit 15 is preferably connected to the feed bunker 1, i.e. the pressurized space, as indicated by the broken line in the figure, the pressure being regulated by means of valve 17. Further, the apparatus is provided with detectors 19 and 20 consisting of limit switches for the indication of the position of the pistons 10 and 11. A pressure sensor 24 is used to measure the pressure in the feed chamber. Similarly, the states of the valves 4, 5 and 13 are indicated by detectors 21, 22 and 23. The operation of the feeding apparatus will be described later on in greater detail.

Figure 2:
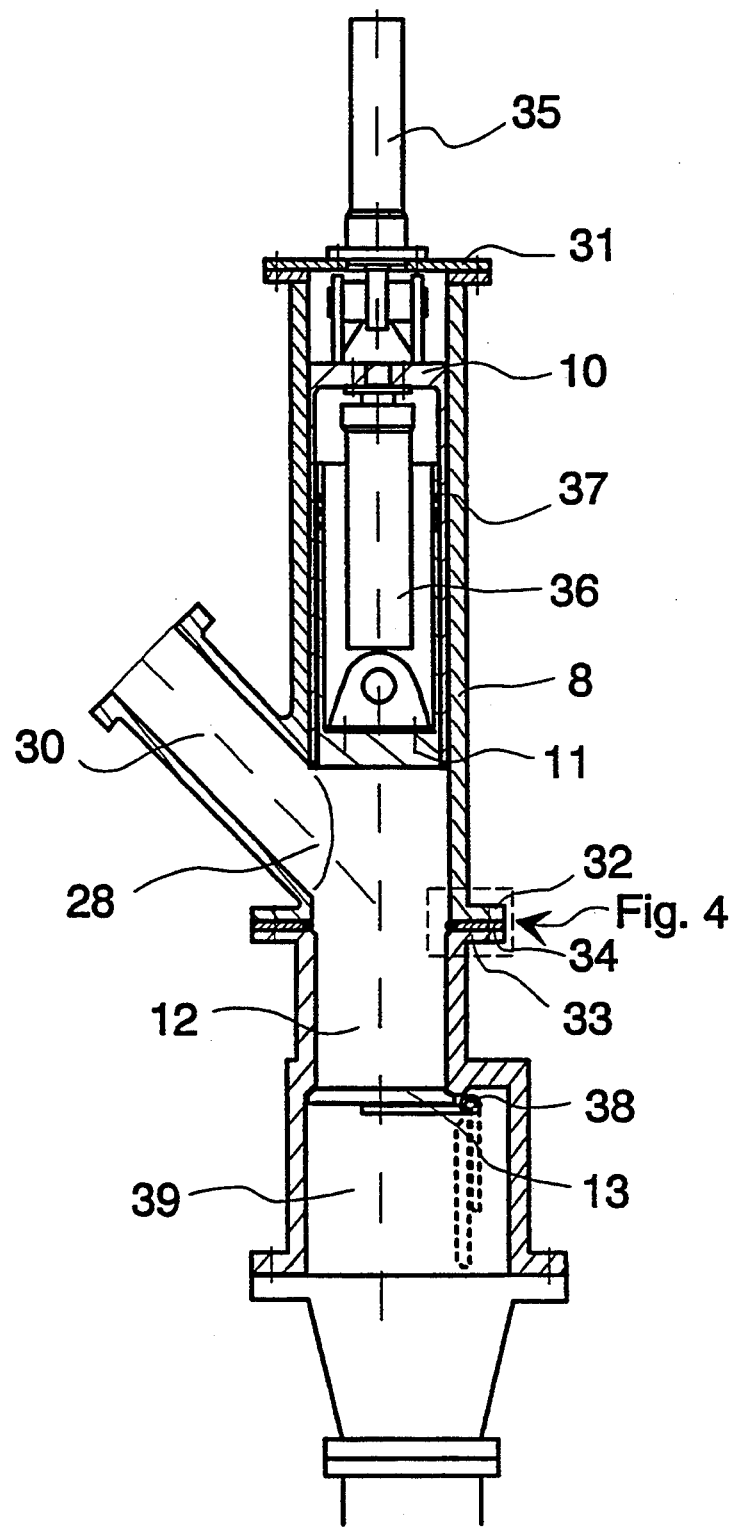
FIG. 2 presents the apparatus of the invention.

FIG. 2 presents the apparatus of the invention for feeding a solid fuel into a bunker 1, the fuel being supplied via a feed tube 3 into a connection 30 in the apparatus. The body of the feeding apparatus consists of a cylinder 8 provided with an aperture 28 in its wall to permit the supply of solid material into the apparatus. The cylinder has a cover 31, which is attached to its flanged upper edge. At the lower end of the cylinder is a flange 32, to which the flange 33 of the the feed chamber 12 below the cylinder is attached. Fitted between the flanges 32 and 33 are a sealing and an adapter 34 as described later on in connection with FIG. 4.

The piston 9 is actuated by means of a hydraulic actuator 35 supported by the cover 31 of the cylinder 8. When the piston is in its rear position, its front edge is level with the edge of the aperture 28 so that the aperture is open, and when the piston is in its front position, its front edge is pressed against the sealing between the cylinder and the feed chamber so that the feed chamber 12 is tightly closed on the side facing the cylinder 8. The piston simultaneously closes the aperture 28 in the cylinder wall. The piston 9 comprises an outer piston 10 and an inner piston 11, the latter being movable with respect to the former. In its rear position, the inner piston is inside the outer piston and is able to move forwards to the bottom of the feed chamber 12. The inner piston 11 is actuated by means of a hydraulic actuator 36. Fitted between the inner piston 11 and outer piston 10 are compression rings 37 to seal the contact surface between the pistons. The compression rings may be teflon-coated steel rings and the inner piston is provided with corresponding grooves for them.

At the lower edge of the feed chamber 12 is a pressure door 13 turnably mounted on a pivot 38, constituting a closing device between the feed chamber 12 and the space 39 leading to the feed bunker 1.

Figure 3:
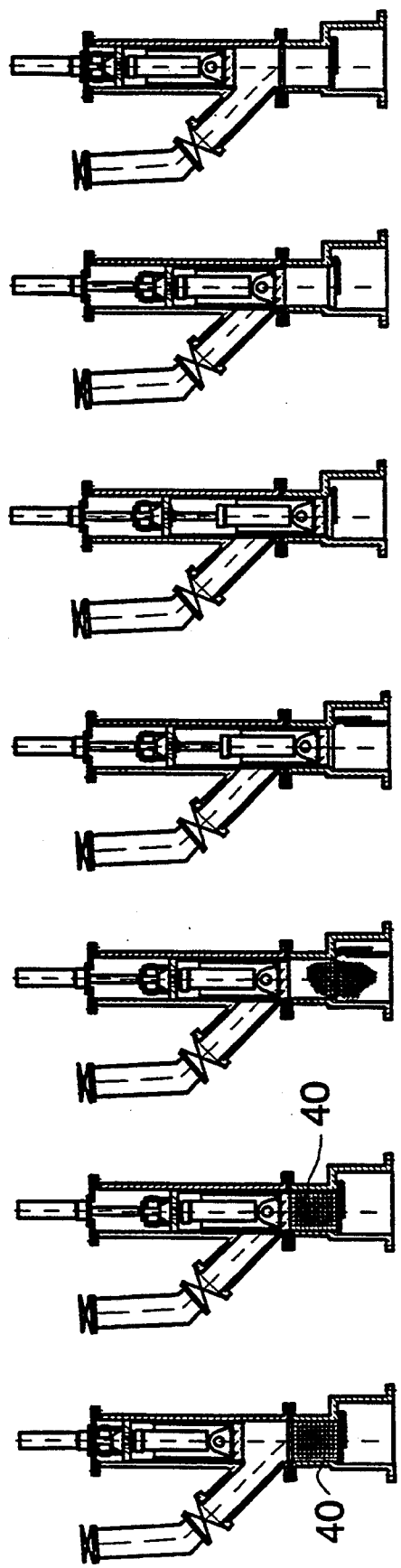
FIG. 3(a) to FIG. 3(g) illustrate the various stages of the procedure of the invention using the apparatus in FIG. 2.

The operation of the procedure of the invention is described below by the aid of FIG. 3, which illustrates the various stages of the procedure.

Figure 4:
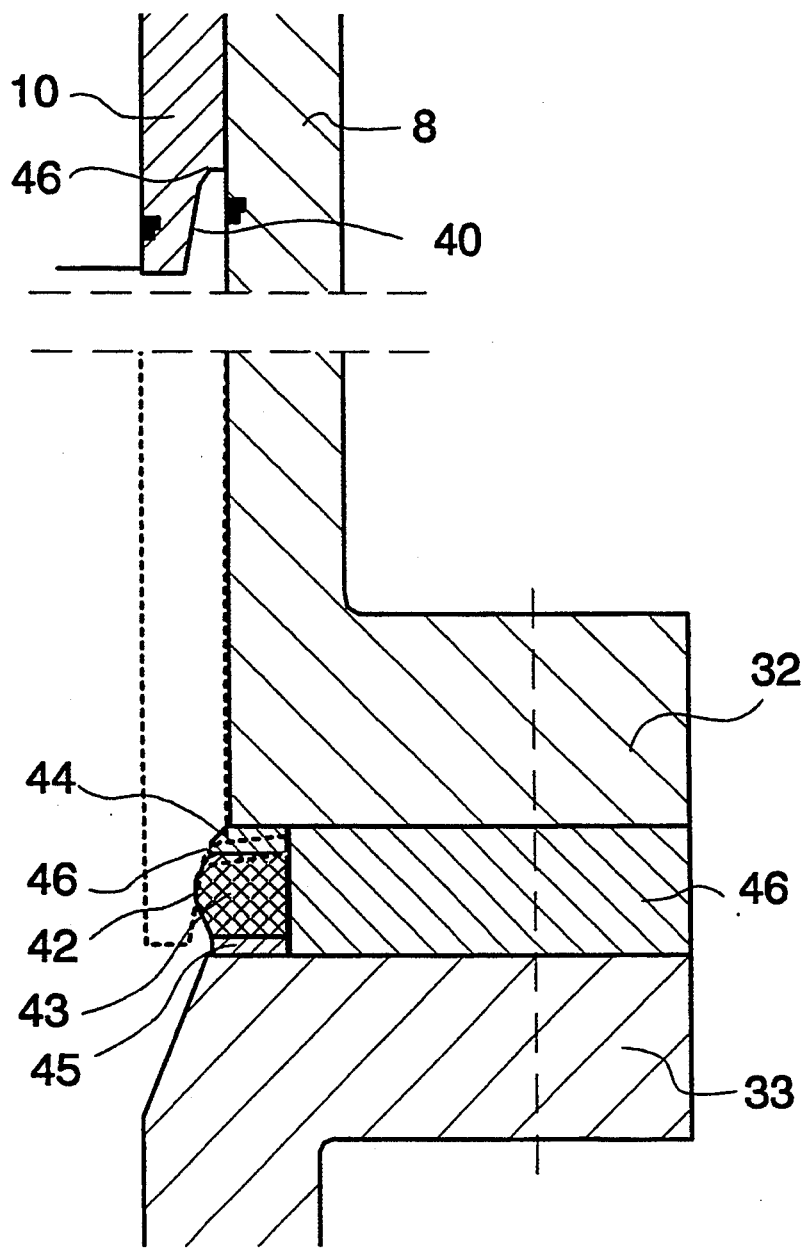
FIG. 4 presents a magnified area of the sealing surface in the apparatus in FIG. 2.

1. At the first stage (FIG. 3a), the dual piston 10, 11 is in its retracted position and the pressure door 13 is closed. The space above the pressure door 13 is at atmospheric pressure, whereas the space below it has a pressure of e.g. 30 bar. A dose of solid material is supplied via the intake connection onto the pressure plate.
2. The outer piston 10 is pushed into the front position towards the pressure space so that its front edge 41 meets the sealing surface 42 (FIG. 3b) at the junction between the cylinder and the feed chamber. At this stage, the inner piston is inside the outer piston. FIG. 4 illustrates the structure of the piston edge 41 and the sealing surface as well as the manner in which they meet. The solid material 40 remains in the insulated space 12 and the pressure in this space is balanced with that prevailing in the space 39 below the pressure door 13, the latter space communicating with the pressurized feed bunker. This is effected by opening the valve 17 in the conduit 14, 15 connecting the two spaces. If the increasing of the pressure is started slightly before the feed chamber is closed and if the end of the conduit is near the sealing surface, the pressure flow can be simultaneously utilized to clean the sealing surface.
3. The pressure door 13 is opened (FIG. 3c) and the inner piston 11 is pushed out into its front position towards the pressurized space (FIG. 3d). The solid material dose 40 is now moved into the space 39 on the other side of the door.
4. The piston is returned to the original position. At this stage (FIG. 3e), the pressure door 13 is closed and the pressure in the feed chamber is reduced to normal via valve 18 (FIG. 1) and the nitrogen is recycled. The dual piston 10, 11 is retracted (FIG. 3f-g) to its rear position and is then ready for the next dose of solid material.

In the procedure of the invention, the outer and inner pistons as well as the pressure door and valves are controlled in mutual synchronization according to the position and state indications obtained from the detectors 19–23, so the pressure door can only be open when the feed chamber is under pressure and the outer piston is tightly pressed against the upper edge of the feed chamber, closing the pressure space. The piston actuators and the pressure door actuating mechanism (not shown) are preferably interconnected. This can be implemented in several alternative ways.

FIG. 4 illustrates the sealing between the outer piston 10 and the feed chamber 12. In the figure, the high position of the outer piston 10 is depicted in solid lines while the low position, in which the piston is pressed against the sealing, is depicted with broken lines. Fitted between the flanges 32 and 33 is a ring 48, which is suitably made of two parts to facilitate replacement of the sealing. Attached to the interior surface of the ring is a seal consisting of elastic material, e.g. resilient rubber 43, and two rings 44 and 45 made of an inelastic material and vulcanized onto the ring of elastic material. The rings are made e.g. of a suitable metal, such as steel. The end of the outer piston 10 is so shaped that it has a bevel 41 and, at the rear edge of the latter, a shoulder 46. When the outer piston moves into its front position, the shoulder 46 is pressed against the metal ring 44 on the upper side of the sealing ring, thus compressing the elastic sealing so that the interior surface 42 of the sealing ring is pressed against the bevelled end 41 of the outer piston. At the same time, as the bevelled end 41 of the piston 10 is thrust into the sealing ring 43, it prevents the rubber from extruding in the radial direction. The other metal ring supports the rubber 43 from the underside.

In the foregoing, the invention has been described by presenting one of its preferred embodiments. However, the presentation is not to be construed as a restriction of the sphere of protection of the patent, but the embodiments of the invention may vary within the limits permitted by the following claims.

We claim:

1. A method for feeding solid material into a pressurized space, characterized in that the solid material is supplied through a feed chamber communicating with the pressurized space via a gate and a piston cylinder adjoining the feed chamber, using a piston consisting of an inner piston and an outer piston, said outer piston being moved inside the piston cylinder and said inner piston being moved inside the outer piston and in the feed chamber, said inner piston further having an outside diameter substantially equal to an inner diameter of said feed chamber, said method comprising the following steps:

the solid material is supplied into the feed chamber through the piston cylinder and an aperture in a piston cylinder wall while the piston is in a rear position,
   the piston is thrust into a front position so that the feed chamber is tightly closed,
   a pressure corresponding to that in the pressurized space is formed in the feed chamber,
   the gate between the pressurized space and the feed chamber is opened, and
   the inner piston is thrust into a front position.

2. The method according to claim 1, characterized in that, in order to close the feed chamber tightly, a ring-shaped seal having a sealing surface is provided at junction of the feed chamber and the piston cylinder and is compressed by a shoulder formed in the outer piston, causing the sealing surface of the seal to be pressed against the outer piston.

3. The method according to claim 2, characterized in that the pressure in the feed chamber is formed via a conduit, said conduit being connected to the pressurized space, and the pressure is regulated by a valve mounted in the conduit.

4. The method according to claim 3, characterized in that the point of connection between one end of the conduit and the feed chamber is adjacent to said junction and sealing surface between the outer piston and the feed chamber, and that an increase of the pressure is started before the outer piston has reached a front position.

5. An apparatus for feeding solid material into a pressurized space, comprising:

a feed chamber communicating with the pressurized space via a gate;

a piston cylinder adjoining the feed chamber and provided with an aperture in the piston cylinder wall for an intake of solid material; and a piston which consists of an inner and an outer piston, said outer piston moves within the piston cylinder and closes the feed chamber tightly when in a front position, and said inner piston, having an outer diameter substantially equal to an inner diameter of said feed chamber, moves inside the outer piston and in the feed chamber to insert the sol id material into the pressurized space.

6. The apparatus according to claim 5, characterized in that said apparatus is provided with a seal placed at or near a junction between the cylinder and the feed chamber, the outer piston being pressed against said seal in a front position.

7. The apparatus according to claim 6, characterized in that the seal is ring-shaped and made of an elastic material and is provided with rings made of an inelastic material, placed on either side of the seal.

8. The apparatus according to claim 7, characterized in that the outer piston has a bevel at an outer surface and has a shoulder at a rear edge of the bevel, said shoulder being pressed against the ring placed on the seal, causing the seal to be pressed against the bevelled part of the outer piston.

9. The apparatus according to claim 5, characterized in that said apparatus is provided with pressurizing equipment for the pressurization of the feed chamber.

10. The apparatus according to claim 9, characterized in that said pressurizing equipment includes a pressurizing device having a pressure source connected via a pipe to the feed chamber and that a pipe end connected to the feed chamber is close to a junction between the cylinder and the feed chamber.

11. The apparatus according to claim 10, wherein said pressure source includes a supply of nitrogen gas.

* * * * *